(12) United States Patent
Holden (10) Patent No.: US 6,309,179 B1
(45) Date of Patent: Oct. 30, 2001

(54) HYDRO TURBINE

(75) Inventor: Joseph T. Holden, Conway, AR (US)

(73) Assignee: Futec, Inc., Houston, TX (US)

( * ) Notice: Subject to any disclaimer, the term of this patent is extended or adjusted under 35 U.S.C. 154(b) by 0 days.

(21) Appl. No.: 09/448,021

(22) Filed: Nov. 23, 1999

(51) Int. Cl.$^7$ ........................................ F03B 1/04
(52) U.S. Cl. .................. 415/202; 415/3.1; 415/98; 415/101; 415/224; 290/54
(58) Field of Search ................................. 415/202, 203, 415/224, 2.1, 3.1, 906, 103, 105, 106, 98, 101; 416/200 R, 200 A; 290/43, 54

(56) References Cited

U.S. PATENT DOCUMENTS

| 267,675 | * | 11/1882 | Cory | 415/202 |
| 751,326 | * | 2/1904 | McAdams | 415/202 |
| 1,039,025 | * | 9/1912 | Carroll | 415/224 |

FOREIGN PATENT DOCUMENTS

| 53-33405 | * | 3/1978 | (JP) | 416/200 R |
| 14443 | * | 3/1926 | (NL) | 415/202 |
| 91/13259 | * | 9/1991 | (WO) | 416/220 R |

* cited by examiner

*Primary Examiner*—Christopher Verdier
(74) *Attorney, Agent, or Firm*—Kenneth A. Roddy (57) ABSTRACT

A hydro turbine has a housing with a cylindrical chamber and opposed end walls with laterally spaced smaller rectangular inlets and laterally spaced larger rectangular outlets formed in upper and lower portions of the chamber side wall in horizontally opposed relation. Smaller rectangular inlet ducts adjoin the inlets, and larger rectangular outlet ducts adjoin the outlets. A cylindrical runner surrounding a power take-off shaft is rotatably enclosed in the chamber and has a central cylindrical hub divided into laterally spaced hub portions with a first and second plurality of circumferentially spaced peripheral blades extending angularly outward from each hub portion, the first plurality of blades being circumferentially offset from the second. Arcuate laterally spaced upper and lower flow passageways of rectangular cross section defined between the central hub portions and circumferential segments of the chamber side wall extend between the upper inlets and outlets and lower inlets and outlets, respectively. The runner and shaft are rotated by conducting an incompressible liquid through each or selected ones of the inlet ducts and discharging it through the respective outlet ducts. The offset blades divide the rectangular flow passageways into unequal volumes such that the volume and head pressure of the incoming liquid is alternately greater or less on one side of the runner than the other side to facilitate rotation and discharge of the liquid.

9 Claims, 6 Drawing Sheets

HYDRO TURBINE

BACKGROUND OF THE INVENTION

1. Field of the Invention

This invention relates generally to fluid impulse turbines, and more particularly to a hydro turbine having a runner with laterally spaced circumferentially offset blades and inlets and outlets of rectangular cross section that alter the fluid flow characteristics and increase efficiency.

2. Brief Description of the Prior Art

A number of different types of turbines have been designed to cover the broad range of hydropower site conditions found around the world. The primary types of hydroelectric turbines used for generating hydroelectric power are commonly classified as "impulse" or "reaction" types. Customarily, certain types of turbines are used for specific head pressures.

Turbines used for low to medium head pressure applications are usually of the reaction type and include Francis and fixed and variable pitch (Kaplan) propeller turbines. The runner or turbine "wheel" of a reaction turbine is completely submersed in water.

Turbines used for high head pressure applications are generally of the impulse type. Impulse turbines include the Pelton, Turgo and crossflow (Mitchell-Banki) designs. Most conventional impulse turbines are designed for a specific horsepower, RPM, and water pressure.

A conventional impulse turbine is a fixed-blade turbine having a runner with curved blades rotatably disposed in a protective casing. The runner of an impulse turbine spins in the air and is driven by high-speed jets of water. Water is metered to the turbine through "needle valves" which send jets of water into the turbine blades to turn the turbine, and the casing merely controls splashing. If water flow is decreased in a conventional impulse turbine, the turbine will loose efficiency.

The main characteristic of a "crossflow" turbine (also called a Mitchell-Banki turbine) is that it has a drum-shaped runner with a series of curved blades and the runner shaft is disposed horizontally, unlike Pelton and Turgo turbines which can have either horizontal or vertical shaft orientation. In the crossflow turbine a rectangular nozzle directs a broad rectangular water jet onto the fill length of the runner. The water jet strikes the blades once flowing from the periphery to the center imparting most of its kinetic energy, and then flows outward from the center imparting a small amount of energy before leaving the turbine.

Harloff, U.S. Pat. No. 4,279,569 discloses a cross-flow turbine machine that extracts energy from a moving fluid. The fluid comprises both liquids and gases. Fluid is guided into the rotor by inlet guide means and then flows through a first rotor, through the interior, through the second rotor, through the exit, and through the diffuser to exit the machine at ambient pressure. Torque is applied to the output shaft due to the change in angular momentum of the fluid across the turbine rotor.

Drees, U.S. Pat. No. 4,368,392 discloses a water turbine for open stream use featuring a vertical-axis cross-flow turbine in which cyclically-pitching blades are supported from one end only to permit the supporting structure and power generation gear to be supported out of the water. In preferred embodiments, there is independent pitch control of the turbine blades to make the blades responsive to the instantaneous flow in their vicinities.

Ossberger et al, U.S. Pat. No. 4,579,506 discloses a horizontal-inflow, vertical-outflow cross-flow turbine having a casing, a runner, a horizontal inlet and a vertical outlet. The inlet is divided by a pivoted guide vane to form a pair of inlet passages. A horizontally extending admission passage is connected to the casing at the inlet side thereof, and a vertically extending discharge passage is formed as a draft tube and connected to the casing at the outlet thereof. The inlet and the guide vane are arranged such that the inlet flow to the runner is directed downward at an angle of about 40°0 with respect to the horizontal, and the outlet flow from the runner is directed substantially vertically. At the outlet there are a pair of side spaces on either side of the runner resulting in an increased cross section conforming to the cross section of the draft tube. Both of these side spaces are vented to the atmosphere by a single venting valve so that the suction pressure in the draft tube does not exceed a predetermined value.

Miller et al, U.S. Pat. 4,464,580 discloses a hydro-electric turbo-machine having a rotor member movable relative to a stationary housing member with a ring-shaped or annular seal between both of these members which serves to seal pressurized water from an external space or region. One of both of these members possesses a sealing surface against which there is pressed a sealing body of the seal which is inserted into the other member.

Stenild, U.S. Pat. No. 5,456,585 discloses a positive displacement fluid motor having a chamber and a rotor having stiff blades which at their outer ends are provided with wings of elastomeric material fastened to the reverse side of the blades in relation to the direction of rotation. The wings are deflected by a wall part in the chamber when passing between the outlet and inlet of the chamber.

The present invention is distinguished over the prior art in general, and these patents in particular, by a hydro turbine having a housing with a cylindrical chamber and opposed end walls with laterally spaced smaller rectangular inlets and laterally spaced larger rectangular outlets formed in upper and lower portions of the chamber side wall in horizontally opposed relation. Smaller rectangular inlet ducts adjoin the inlets, and larger rectangular outlet ducts adjoin the outlets. A cylindrical runner surrounding a power take-off shaft is rotatably enclosed in the chamber and has a central cylindrical hub divided into laterally spaced hub portions with a first and second plurality of circumferentially spaced peripheral blades extending angularly outward from each hub portion, the first plurality of blades being circumferentially offset from the second. Arcuate laterally spaced upper and lower flow passageways of rectangular cross section defined between the central hub portions and circumferential segments of the chamber side wall extend between the upper inlets and outlets and lower inlets and outlets, respectively. The runner and shaft are rotated by conducting an incompressible liquid through each or selected ones of the inlet ducts and discharging it through the respective outlet ducts. The offset blades divide the rectangular flow passageways into unequal volumes such that the volume and head pressure of the incoming liquid is alternately greater or less on one side of the runner than the other side to facilitate rotation and discharge of the liquid.

SUMMARY OF THE INVENTION

It is therefore an object of the present invention to provide a hydro turbine that will operate at substantially the same efficiency over a range of pressure heads.

It is another object of this invention to provide a hydro turbine that will operate at different RPM settings and water pressures without losing efficiency.

Another object of this invention is to provide a hydro turbine that may operate using single or multiple intake ports to gage the influx of water.

Another object of this invention is to provide a hydro turbine having a runner disposed between at least one upstream intake port of smaller rectangular cross section and a downstream outlet port of larger rectangular cross section that serve as thrust tubes to increase head pressure.

A further object of this invention is to provide a hydro turbine that operates under variable flow rates and may be used for AC or DC power.

A still further object of this invention is to provide a hydro turbine which is simple in construction, inexpensive to manufacture and rugged and reliable in operation.

Other objects of the invention will become apparent from time to time throughout the specification and claims as hereinafter related.

The above noted objects and other objects of the invention are accomplished by a hydro turbine having a housing with a cylindrical chamber and opposed end walls with laterally spaced smaller rectangular inlets and laterally spaced larger rectangular outlets formed in upper and lower portions of the chamber side wall in horizontally opposed relation. Smaller rectangular inlet ducts adjoin the inlets, and larger rectangular outlet ducts adjoin the outlets. A cylindrical runner surrounding a power take-off shaft is rotatably enclosed in the chamber and has a central cylindrical hub divided into laterally spaced hub portions with a first and second plurality of circumferentially spaced peripheral blades extending angularly outward from each hub portion, the first plurality of blades being circumferentially offset from the second. Arcuate laterally spaced upper and lower flow passageways of rectangular cross section defined between the central hub portions and circumferential segments of the chamber side wall extend between the upper inlets and outlets and lower inlets and outlets, respectively. The runner and shaft are rotated by conducting an incompressible liquid through each or selected ones of the inlet ducts and discharging it through the respective outlet ducts. The offset blades divide the rectangular flow passageways into unequal volumes such that the volume and head pressure of the incoming liquid is alternately greater or less on one side of the runner than the other side to facilitate rotation and discharge of the liquid.

DESCRIPTION OF THE PREFERRED EMBODIMENT

Figure 1:
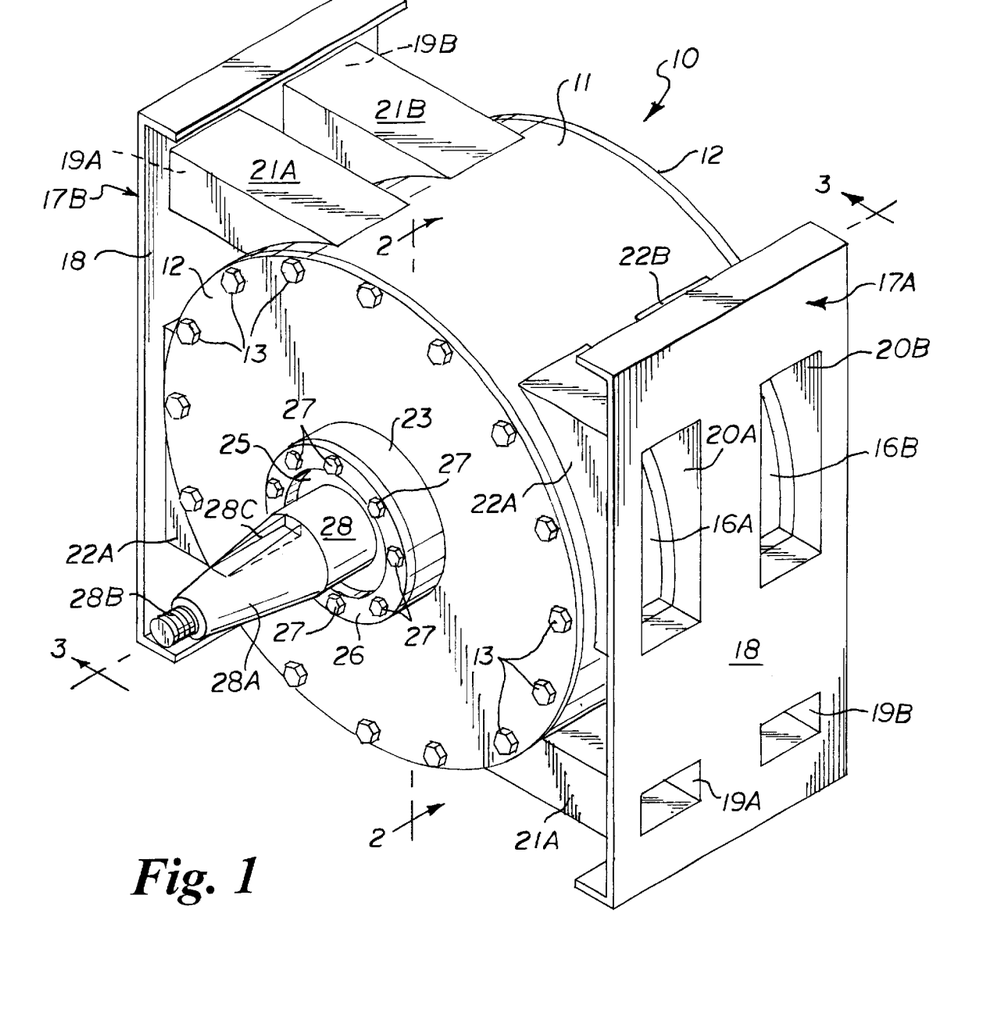
FIG. 1 is a perspective view of the hydro turbine apparatus in accordance with the present invention.
Figure 2:
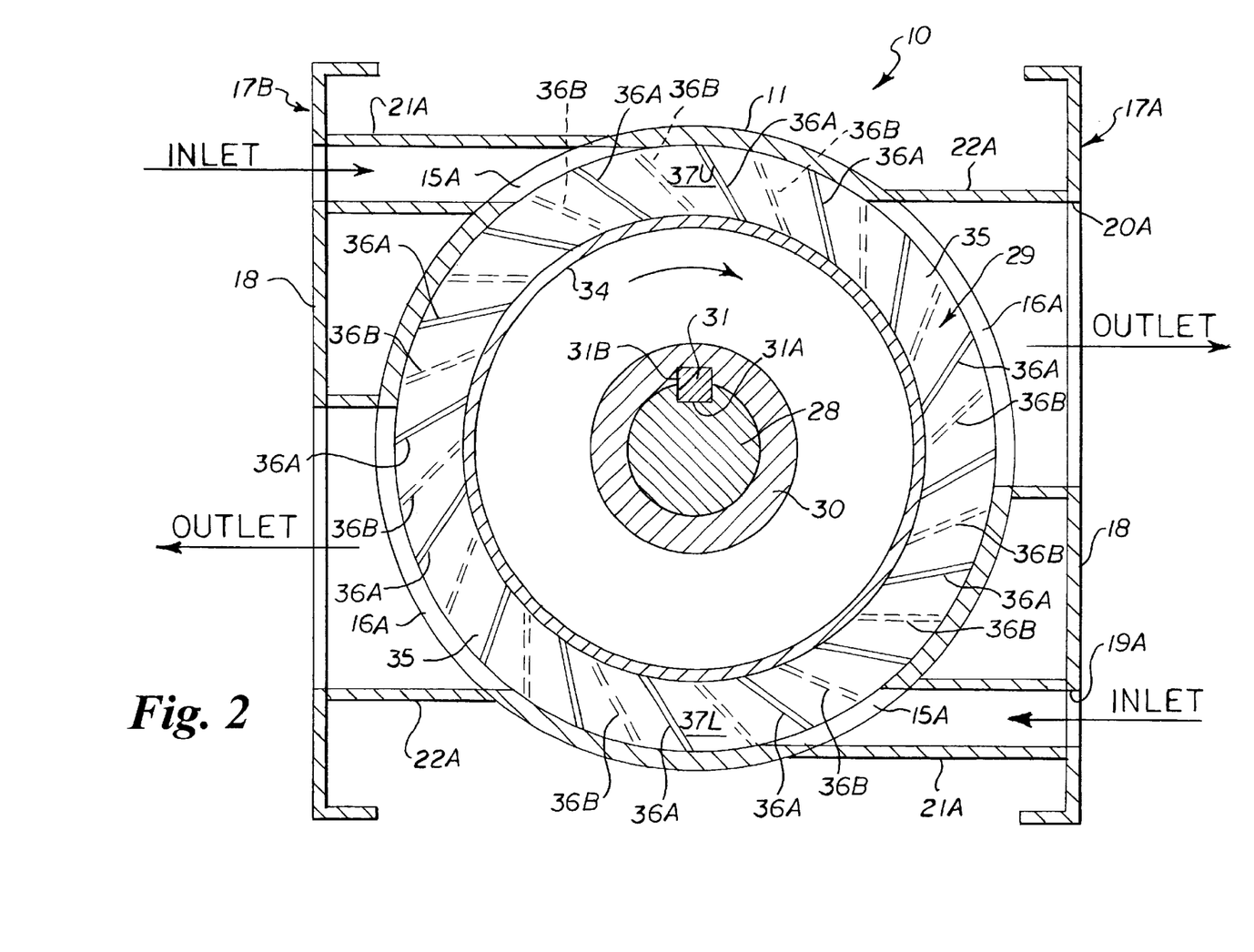
FIG. 2 is a transverse cross section view of the hydro turbine apparatus taken along line 2—2 of FIG. 1.
Figure 3:
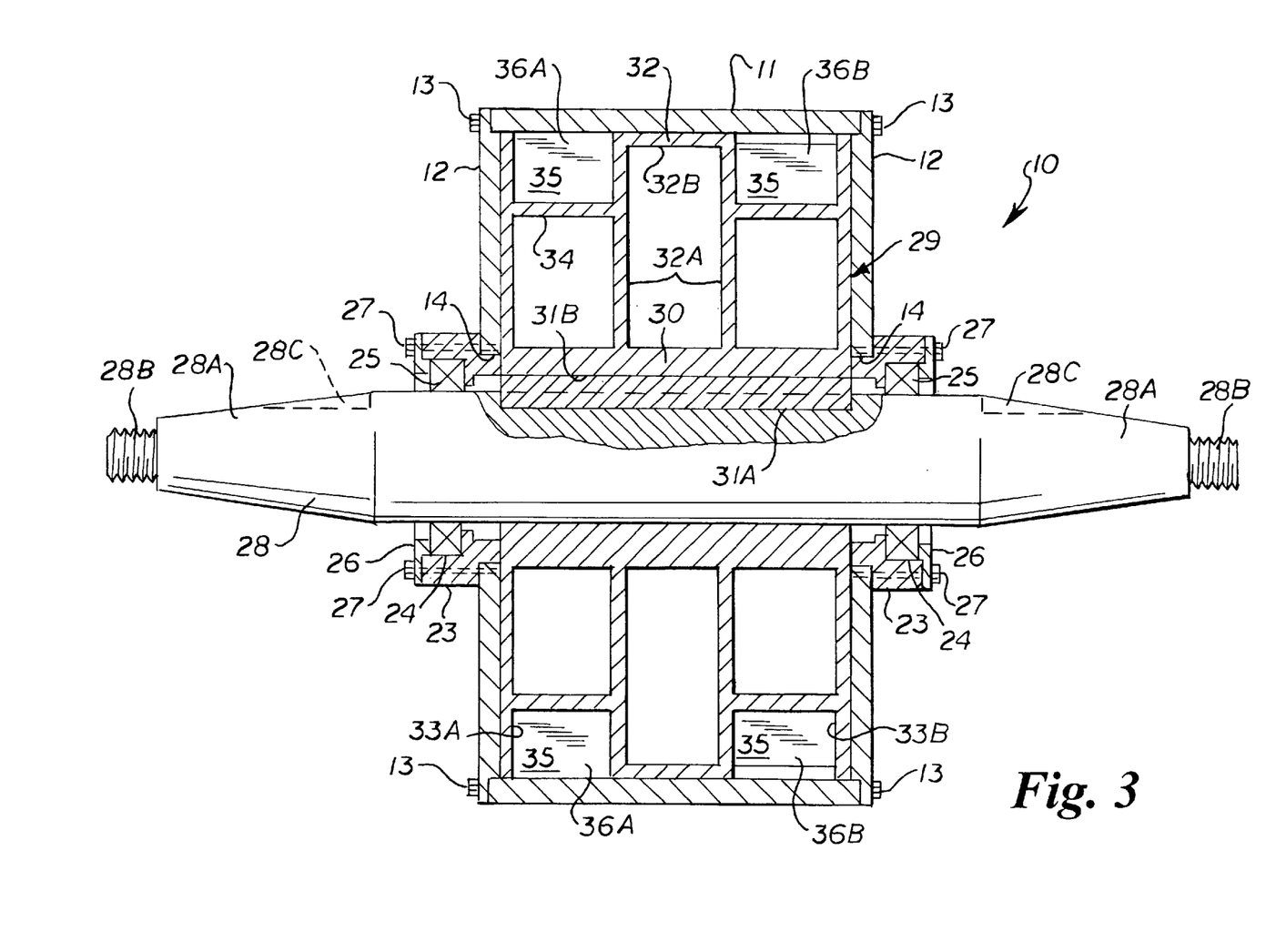
FIG. 3 is a longitudinal cross section view through one of the fluid flow chambers of the hydro turbine apparatus taken along line 3—3 of FIG. 1.

Referring to the drawings by numerals of reference there is shown in FIGS. 1, 2 and 3, a hydro turbine 10 in accordance with a preferred embodiment of the invention. The turbine 10 has a hollow cylindrical housing 11, enclosed at each end by flat circular end plates 12 which are secured to open ends of the housing by bolts 13, or other suitable means. Each end plate 12 has a central bore 14 (FIG. 3).

Figure 4:
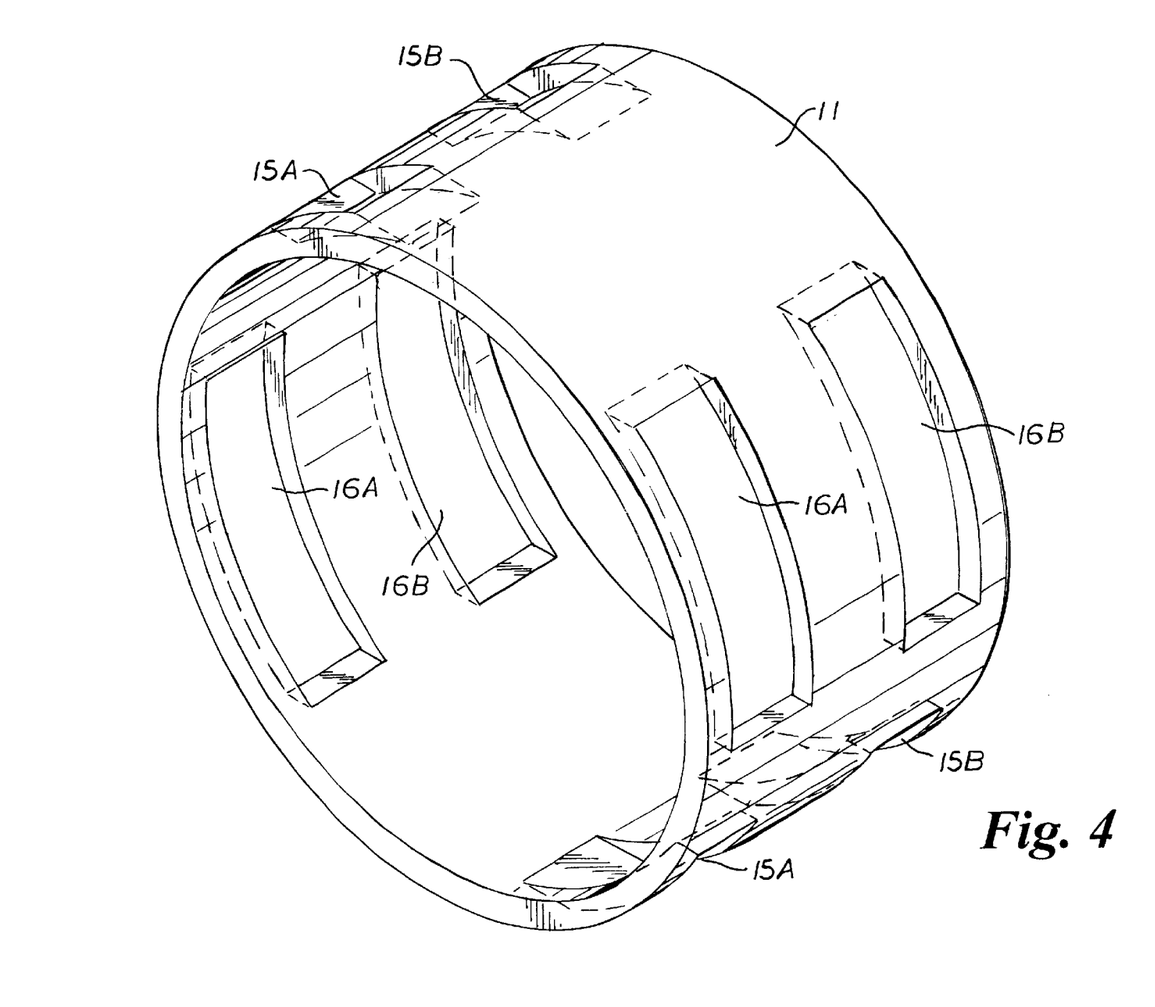
FIG. 4 is a perspective view of the housing of the hydro turbine apparatus in an unassembled condition showing the rectangular fluid flow inlets and outlets.

As best seen in FIGS. 2 and 4, a pair of laterally spaced smaller rectangular inlet ports 15A,15B and a pair of laterally spaced larger rectangular outlet ports 16A,16B are formed in each side of the cylindrical housing 11. On one side of the housing 11, the larger outlet ports 16A,16B are disposed above the smaller inlet ports 15A,15B and on the opposite side of the housing the larger outlet ports are disposed below the smaller inlet ports in circumferentially spaced relation.

As shown in FIGS. 2 and 4, the laterally spaced smaller inlet ports 15A,15B on one side of the housing 11 are disposed in horizontally opposed relation to the laterally spaced larger outlet ports 16A,16B on the opposite side of the housing, respectively.

Figure 5:
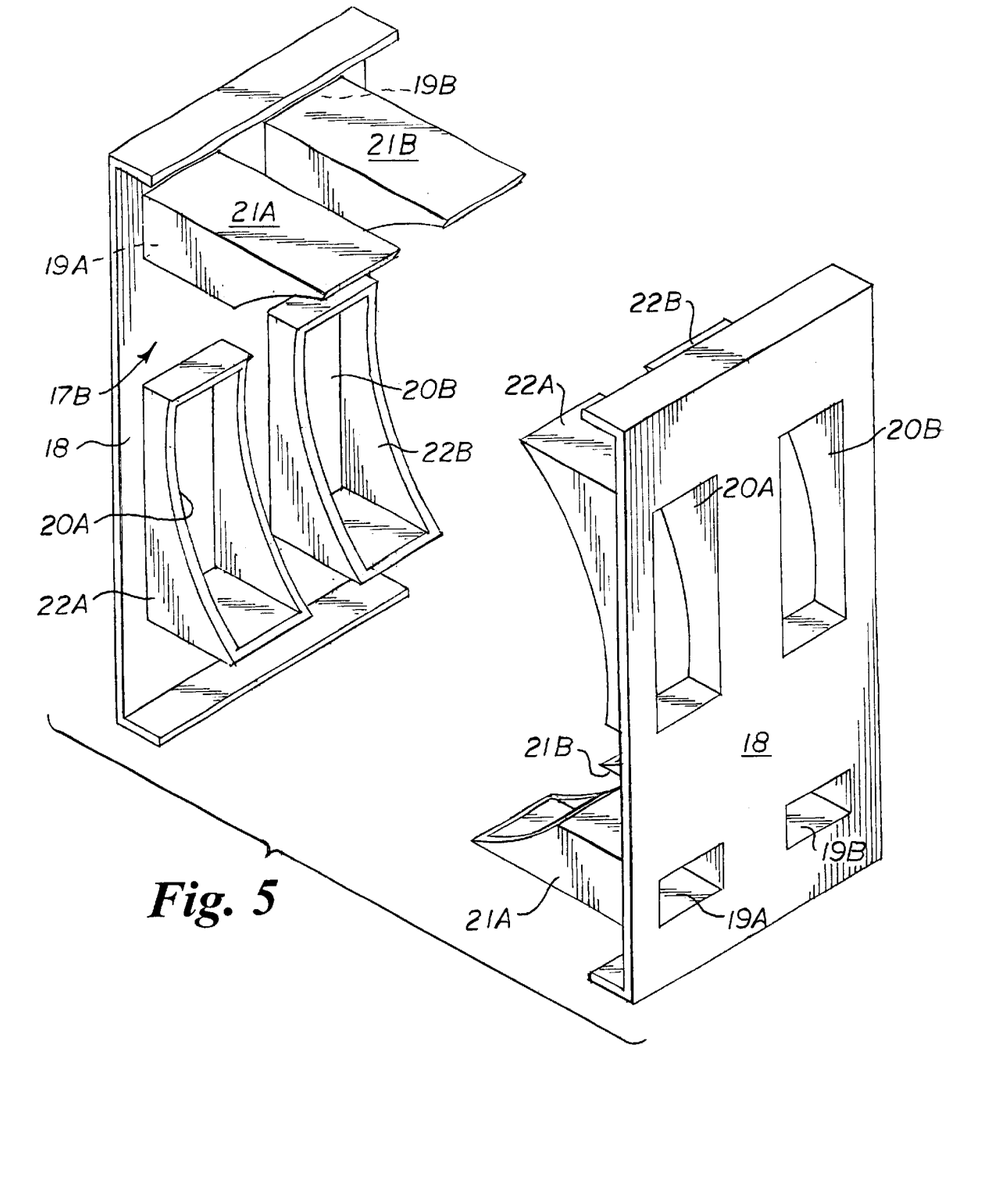
FIG. 5 is a perspective view of the flow tube manifolds of the hydro turbine apparatus in an unassembled condition showing the rectangular inlet and outlet ducts.

Referring now to FIGS. 1, 2 and 5, a pair of flow tube manifolds 17A and 17B are each secured to a respective side of the housing 11 in horizontally opposed relation. The flow tube manifolds 17A and 17B each have a flat rectangular plate or flange 18 with a pair of laterally spaced smaller rectangular inlet openings 19A,19B and a pair of laterally spaced larger rectangular outlet openings 20A,20B extending therethrough. In one manifold 17A, the larger outlet openings 20A,20B are disposed above the smaller inlet openings 19A,19B and in the other manifold 17B the larger outlet openings are disposed below the smaller inlet openings in vertically spaced relation.

A pair of laterally spaced smaller rectangular inlet ducts 21A,21B and a pair of laterally spaced larger rectangular outlet ducts 22A,22B are secured at one end to one side of the flanges 17A,17B and each has a curved outer end which is secured to the cylindrical side wall of the housing 11. The interior of the inlet ducts 21A,21B and outlet ducts 22A,22B are axially aligned and in sealed fluid communication with the respective inlet ports 15A,15B and outlet ports 16A,16B of the housing 11 and the openings 19A,19B and 20A,20B in the flanges 17A,17B. The side walls of the larger laterally spaced inlet ducts 21A,21B define a rectangular fluid inlet passageway of a smaller cross sectional area and the side walls of the larger outlet ducts 22A,22B define a rectangular fluid outlet passageway of a larger cross sectional area.

Referring now to FIGS. 1, 2, 3, and 6, one end of a cylindrical bearing housing 23 is received in the central bore 14 of each end plate 12 of the turbine housing 11. Each bearing housing 23 has a central bore and a larger diameter bore 24 at its outer end. A rotary bearing 25 (represented schematically) is retained in the bore 24 of each bearing housing 23 by a generally disc-shaped bearing retainer 26.

In the illustrated example, the bearing housings 23 and bearing retainers 26 are provided with bolt holes and are secured to the end plates 12 by bolts 27 having a threaded shank portion received through the bolt holes and threadedly engaged in threaded holes in the end plates.

A longitudinal central power take-off shaft 28 rotatably mounted in the bearings 25 extends through the center of the housing and has opposed outer ends 28A that extend outwardly a distance from the end plates 12 and bearing housings 23 at each end of the turbine housing 11. The outer ends 28A of the shaft 28 may be tapered and provided with threads 28B and keyways 28C for mounting sheaves, gears, or other conventional power take-off components (not shown) at either or both ends to operate a conventional electric generator.

Figure 6:
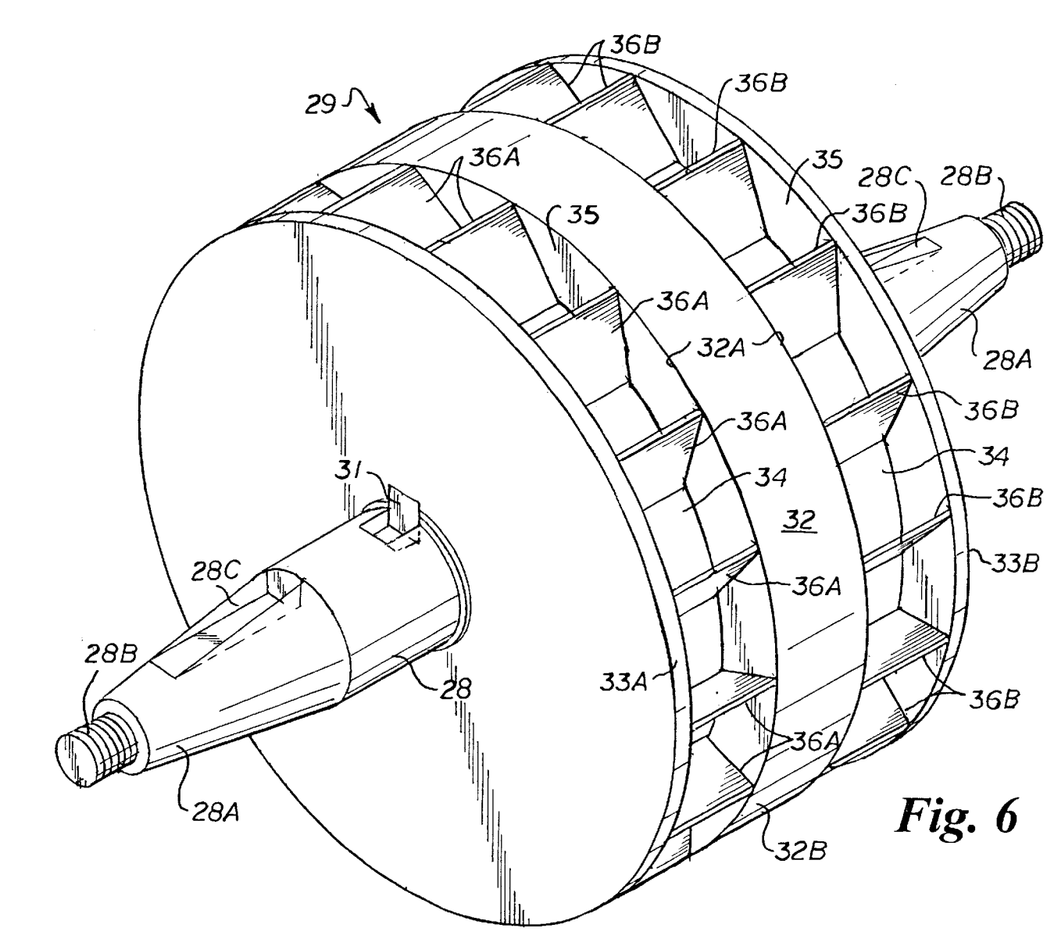
FIG. 6 is a perspective view of the runner of the hydro turbine apparatus in an unassembled condition showing the laterally spaced circumferentially offset blade arrangement.

A generally drum-shaped runner 29 rotatably disposed within the housing 11 is secured to the shaft 28 for rotatably driving the shaft. The runner 29 has a smaller diameter central hub 30 secured on the shaft 28 by a key 31 received in keyways 31A and 31B on the exterior of the shaft and interior of the hub 30, respectively. The runner 29 has a large center ring portion 32 formed by parallel spaced circular side walls 32A extending radially outward from the hub 30 and adjoined at their outer periphery by a circumferential outer wall 32B. A pair of flat circular outer end walls 33A and 33B extend radially outward, one from each outer end, of the hub 30 in parallel outwardly spaced relation to the side walls 32A of the center ring portion 32 and are adjoined thereto by a flat circular intermediate ring 34.

The outer diameter of the outer end walls 33A,33B and outer diameter of the circumferential outer wall 32B of the center ring portion 32 are substantially the same. The outer diameter of the intermediate ring 34 is smaller than the outer diameter of the outer end walls 33A,33B and circumferential outer wall 32B to define a circumferential annular space 35 on each side of the center ring 32.

A first plurality of flat rectangular blades 36A are disposed in the annular space between one end wall 33A and one side wall 32B of the center ring 32 and each extends angularly outward from the exterior of the intermediate ring 34 to the outer periphery of the end wall 33A and the outer wall 32B of the center ring 32. A second plurality of flat rectangular blades 36B are disposed in the annular space between the other end wall 33B and the other side wall 32A of the center ring 32 in circumferentially spaced apart relation and each extends angularly outward from the exterior of the intermediate ring 34 to the outer periphery of the end wall 33B and the outer wall 32B of the center ring 32.

As best seen in FIGS. 2 and 6, the first plurality of blades 36A on one side of the center ring 32 is circumferentially offset from the second plurality of blades 36B (shown in dashed line) on the other side of the center ring. In the illustrated example, there are 16 blades on one side of the center ring 32 (first plurality 36A) which are circumferentially spaced apart by 22.5°, and 16 blades on the other side of the center ring (second plurality 36B represented in dashed line) ring which are circumferentially spaced apart by about 22.5°. The first plurality of blades 36A are offset circumferentially from the second plurality of blades 36B by about 11.25°.

Unlike most prior art crossflow and impulse turbines, the outer diameter of the runner 29 and the inner diameter of the housing 11 of the present invention are dimensioned to provide a sufficient sealing relationship therebetween to minimize leakage of liquids. For example, the difference between the inner diameter of the housing 11 and outer diameter of the outer end walls 33A,33B and circumferential outer wall 32B of the center ring 32 of the runner 29 may be in the range of from about 0.005" to about 0.010", which is sufficient to prevent water leakage in an amount that would adversely affect the head pressure.

When the turbine 10 is assembled, the runner 29 divides the interior of the housing 11 into upper and lower semi-circular segments (FIG. 2) and the center ring 32 divides the upper and lower segments into a pair of laterally spaced upper and lower arcuate chambers 37U and 37L (FIG. 3).

The upper arcuate chambers 37U complete a fluid flow path between the upper inlet and outlet ports 15A,15B and 16A,16B of the housing and the interior of the upper inlet ducts 21A,21B and outlet ducts 22A,22B of the flow tube manifolds 17A and 17B. The lower arcuate chambers 37L complete a fluid flow path between the lower inlet and outlet ports 15A,15B and 16A,16B of the housing 11 and the interior of the lower inlet ducts 21A,21B and outlet ducts 22A,22B of the flow tube manifolds 17A and 17B. The laterally spaced first and second plurality of blades 36A and 36B of the runner 29 are disposed in alignment with the upper and lower fluid flow paths.

Although the turbine has been shown and described, for purposes of illustration, as having a pair of laterally spaced upper and lower inlets and outlets and the runner having two sets of circumferentially offset blades and defining a pair of laterally spaced upper and lower fluid flow passageways, it should be understood that the turbine may be provided with multiple laterally spaced upper and lower inlets and outlets and the runner provided with multiple sets of circumferentially offset blades and defining multiple laterally spaced upper and lower fluid flow passageways.

Operation

Turbines according to the embodiment depicted in FIG. 1 have a housing 11 approximately 30" in diameter and are easily transported. They may be positioned and operated with the shaft 28 and runner 29 in either a horizontal or vertical plane.

The turbines may be placed near to, or remote from, an elevated body of water with one or more of the laterally spaced or vertically spaced inlets 15A,15B of the flow tube manifolds 17A,17B connected in fluid communication with the lower end of a conventional penstock leading from the body of water and the outlets connected with a conventional draft tube. They may also be submerged in a flowing stream of water with inlets 15A,15B on one side of the turbine facing upstream and the generator to which the turbine is operatively connected disposed above the water line.

The turbines may also be submerged in tidal waters or the wave path along a shoreline wherein water enters the inlets 15A,15B on one side of the turbine during high tide or an incoming wave and enters the inlets on the opposite side during low tide or as the wave is outgoing.

Water enters the upper portion of the housing 11 in two separate streams through the interior of the upper laterally spaced smaller rectangular inlet ducts 21A,21B and ports 15A,15B, flows through the upper arcuate chambers 37U, impinges on the exposed first and second plurality of blades 36A and 36B causing rotation of the runner 29 and power take-off shaft 28, and passes out of the housing 11 through the upper larger rectangular outlet ports 16A,16B and outlet ducts 22A,22B.

Because the blades 36A on one side of the center ring 32 are circumferentially offset from the blades 36B on the other side, the intake area and thus the volume of water entering the housing on one side of the runner center ring 32 is alternately greater and less than the area and volume of water on the other side. The larger volume of water produces a greater head pressure on one side which facilitates rotation of the runner and discharge of the water from the side having the smaller volume and head pressure. This action is repeated continuously on alternating sides of the runner center ring 32 as it rotates. The offset blades also stabilize the runner at higher RPMs.

Depending upon the particular installation, head pressure and/or flow characteristics of the source water stream, the lower section of the housing 11 and lower fluid flow path 37L between the lower inlet and outlet ports 15A,15B and 16A,16B of the housing and the interior of the lower inlet ducts 21A,21B and outlet ducts 22A,22B of the flow tube manifolds 17A and 17B may be left open to the atmosphere. In this case, the turbine operates similar to an impulse turbine in that the resistance pressure is lessened and the runner spins more freely and higher RPM may be achieved.

In situations where the source stream has a low head pressure and/or flow characteristics, water may be simultaneously conducted into the lower portion of the housing 11 in the reverse direction from the water flowing through the upper portion. In this case, water enters in two separate streams through the interior of the lower laterally spaced smaller rectangular inlet ducts 21A,21B and ports 15A,15B, flows through the lower arcuate chambers 37L, impinges on the exposed lower first and second plurality of blades 36A and 36B causing rotation of the runner 29 and power take-off shaft 28, and passes out of the housing 11 through the lower larger rectangular outlet ports 16A,16B and outlet ducts 22A,22B. Thus, water impinges both the upper and lower portions of the runner 29 to facilitate rotation.

In this example, the area and thus the volume of water entering on one lateral side of the upper portion 37U of the runner center ring 32 is alternately greater and less that than the water on the other side on the upper portion of the center ring, as described above, and the area and thus the volume of water entering on one lateral side of the lower portion 37L of the runner is alternately greater and less that than the area and volume of water on the other side of the lower portion. However, in this instance, when the volume of water impinging the exposed blades of the upper portion 37U of the runner 29 is greater, the vertically spaced volume of water impinging the exposed blades of the lower portion 37L of the runner at the same time is less. In other words, the upper portion 37U of the runner is subjected to alternating head pressures which alternate laterally and at the same time the lower portion of the runner is subjected to laterally alternating head pressures that alternate in the opposed direction and opposed magnitude from the those of the upper portion.

Also in situations where the source stream has a low head pressure, the turbine may be provided with multiple laterally spaced upper and lower inlets and outlets and the runner provided with multiple sets of circumferentially offset blades and multiple laterally spaced upper and lower fluid flow passageways may be defined between the runner and the housing interior.

The rectangular inlets and outlets are of a given capacity to affect the fluid flow. Each of the multiple intake ports may be controlled separately to gage the influx of water and handle variable flow rates, volumes and pressures. Fluid flowing through a square or rectangular tube will not rotate, therefore the flow through the turbine is substantially linear, allowing flow rates to be decreased with increased fluid velocity.

While this invention has been described fully and completely with special emphasis upon a preferred embodiment, it should be understood that within the scope of the appended claims the invention may be practiced otherwise than as specifically described herein.

What is claimed is:

1. A hydro turbine for extracting energy from an incompressible liquid, comprising:

a housing having a cylindrical chamber with a circumferential side wall and opposed end walls, a smaller rectangular inlet and a larger rectangular outlet formed in said side wall in horizontally opposed relation;

an inlet duct of smaller rectangular cross section having an interior connected in fluid communication with said smaller rectangular inlet, and an outlet duct of larger rectangular cross section having an interior connected in fluid communication with said larger rectangular outlet;

a cylindrical runner rotatably enclosed in said chamber having an axis of rotation perpendicular to the flow of said incoming incompressible liquid and having a central cylindrical hub with a plurality of circumferentially spaced peripheral blades extending angularly outward therefrom in a direction opposite the direction of the incoming liquid;

a power take-off shaft connected with said runner to rotate therewith and having opposed outer ends extending rotatably and sealingly through said end walls for connection to power generating means; and a circumferential segment of said chamber side wall and said runner central hub defining an arcuate flow passageway of rectangular cross section extending between said inlet and said outlet;

said runner and said shaft being rotated by conducting said incompressible liquid through said inlet duct of smaller rectangular cross section and said smaller rectangular inlet to engage a plurality of said blades disposed in said flow passageway and discharging said liquid through said larger rectangular outlet and said outlet duct of larger cross section.

2. A hydro turbine according to claim 1, wherein said housing cylindrical chamber has a plurality of said smaller rectangular inlets in laterally spaced relation and a plurality of said larger rectangular outlets in laterally spaced relation formed in said side wall, said inlets and said outlets disposed in horizontally opposed relation;

a plurality of said inlet ducts of smaller rectangular cross section each having an interior connected in fluid communication with a respective one of said inlets, and a plurality of said outlet ducts of larger rectangular cross section each having an interior connected in fluid communication with a respective one of said outlets;

said central cylindrical hub is divided into a plurality of laterally spaced central hub portions with a plurality of said circumferentially spaced peripheral blades extending angularly outward from each of said central hub portions, respectively, in a direction opposite the direction of the incoming liquid;

said plurality of said peripheral blades extending from alternating ones of said central hub portions being offset circumferentially from laterally adjacent ones of said central hub portions;

said runner and a circumferential segment of said chamber side wall and said laterally spaced central hub portions define laterally spaced isolated arcuate flow passageways of rectangular cross section extending between said inlets and said outlets, respectively;

said runner and said shaft being rotated by conducting said incompressible liquid through said inlet ducts and inlets to engage said plurality of said circumferentially offset blades disposed in respective ones of said flow passageways and discharging said liquid through respective ones of said outlets and outlet ducts;

said plurality of circumferentially offset blades dividing said laterally spaced flow passageways into unequal volumes such that the volume and head pressure of said incoming liquid is alternately greater and less on laterally adjacent portions of said runner to facilitate rotation of said runner and discharge of said liquid.

3. A hydro turbine according to claim 1, wherein said housing cylindrical chamber has an upper smaller rectangular inlet and an upper larger rectangular outlet formed in an upper portion of said side wall in horizontally opposed relation, and a lower smaller rectangular inlet and a lower larger rectangular outlet formed in a lower portion of said side wall in horizontally opposed relation;

said upper smaller rectangular inlet disposed above said lower larger rectangular outlet on one side of said housing, and said upper larger rectangular outlet disposed above said lower smaller rectangular inlet on an opposite side of said housing such that fluid is conducted between said upper inlet and upper outlet in a first direction and between said lower inlet and lower outlet in an opposite direction;

an upper inlet duct of smaller rectangular cross section having an interior connected in fluid communication with said upper inlet, an upper outlet duct of larger rectangular cross section having an interior connected in fluid communication with said upper outlet, a lower inlet duct of smaller rectangular cross section having an interior connected in fluid communication with said lower inlet, and a lower outlet duct of larger rectangular cross section having an interior connected in fluid communication with said lower outlet;

an upper circumferential segment of said chamber side wall and said runner central hub defining an upper arcuate flow passageway of rectangular cross section extending between said upper inlet and said upper outlet, and a lower circumferential segment of said chamber side wall and said runner central hub defining a lower arcuate flow passageway of rectangular cross section extending between said lower inlet and said lower outlet;

said runner and said shaft being rotated by simultaneously conducting a first stream of said incompressible liquid in one direction through said upper inlet duct and said upper inlet to engage a plurality of said blades disposed in said upper flow passageway and discharging said first stream of liquid through said upper outlet and said upper outlet duct, and conducting a second stream of said incompressible liquid in an opposed direction through said lower inlet duct and said lower inlet to engage a plurality of said blades disposed in said lower flow passageway and discharging said second stream of liquid through said lower outlet and said lower outlet duct.

4. A hydro turbine according to claim 3, wherein said housing cylindrical chamber has a plurality of laterally spaced upper smaller rectangular inlets and a plurality of laterally spaced upper larger rectangular outlets formed in an upper portion of said side wall in horizontally opposed relation, respectively, and a plurality of laterally spaced lower smaller rectangular inlets and a plurality of laterally spaced lower larger rectangular outlets formed in a lower portion of said side wall in horizontally opposed relation, respectively;

said upper smaller rectangular inlets disposed above said lower larger rectangular outlets on one side of said housing, and said upper larger rectangular outlets disposed above said lower smaller rectangular inlets on an opposite side of said housing such that fluid is conducted between said upper inlets and upper outlets in a first direction and between said lower inlets and said lower outlets in an opposite direction;

a plurality of upper inlet ducts of smaller rectangular cross section each having an interior connected in fluid communication with a respective one of said upper inlets, a plurality of upper outlet ducts of larger rectangular cross section each having an interior connected in fluid communication with a respective one of said upper outlets, a plurality of lower inlet ducts of smaller rectangular cross section each having an interior connected in fluid communication with a respective one of said lower inlets, and a plurality of lower outlet ducts of larger rectangular cross section each having an interior connected in fluid communication with a respective one of said lower outlets;

said central cylindrical hub is divided into a plurality of laterally spaced central hub portions with a plurality of said circumferentially spaced peripheral blades extending angularly outward from each of said central hub portions, respectively, in a direction opposite the direction of the incoming liquid;

said plurality of said peripheral blades extending from alternating ones of said central hub portions being offset circumferentially from said plurality of peripheral blades extending from laterally adjacent ones of said central hub portions;

said runner and a circumferential upper segment of said chamber side wall and said plurality of laterally spaced central hub portions define a plurality of laterally spaced isolated upper arcuate flow passageways of rectangular cross section extending between said upper inlets and said upper outlets, respectively, and a lower circumferential segment of said chamber side wall and said laterally spaced central hub portions define a plurality of laterally spaced isolated lower arcuate flow passageways of rectangular cross section extending between said lower inlets and said lower outlets, respectively; and said runner and said shaft being rotated by conducting an upper stream of incompressible liquid in one direction through selected ones of said upper inlet ducts and inlets to engage said plurality of said circumferentially offset blades disposed in respective ones of said upper flow passageways and discharging said liquid through respective ones of said upper outlets and outlet ducts; and conducting a lower stream of incompressible liquid in an opposed direction through selected ones of said lower inlet ducts and inlets to engage said plurality of said circumferentially offset blades disposed in respective ones of said lower flow passageways and discharging said liquid through respective ones of said lower outlets and outlet ducts;

said plurality of circumferentially offset blades dividing said laterally spaced upper and lower flow passageways into unequal volumes such that the volume and head pressure of said upper stream and said lower stream of incoming liquid are alternately greater and less on alternate lateral upper and lower portions of said runner to facilitate rotation of said runner and discharge of said liquid streams.

5. A hydro turbine according to claim 1, wherein said runner and blades have an outer diameter and said cylindrical chamber circumferential side wall has as an inner diameter sized relative to one another to effect a sufficient liquid-tight sealing relation therebetween to provide positive displacement of said incompressible liquid.

6. A method of generating power using an incompressible liquid comprising the steps of:

providing a hydro turbine having a power take-off shaft surrounded by a cylindrical runner rotatably enclosed in and surrounded by a cylindrical chamber having a circumferential side wall with a smaller rectangular inlet and a larger rectangular outlet formed in said side wall in horizontally opposed relation, an inlet duct of smaller rectangular cross section joined in fluid communication with said smaller rectangular inlet, and an outlet duct of larger rectangular cross section joined in fluid communication with said larger rectangular outlet;

said cylindrical runner having a central cylindrical hub with a plurality of circumferentially spaced peripheral blades extending angularly outward therefrom, a circumferential segment of said chamber side wall and said runner central hub defining an arcuate flow passageway of rectangular cross section extending between said inlet and said outlet, and a plurality of said blades disposed in said flow passageway;

connecting said power take-off shaft with a power generator;

conducting said incompressible liquid through said inlet duct of smaller rectangular cross section and said smaller rectangular inlet to engage a plurality of said blades disposed in said flow passageway and discharging said liquid through said larger rectangular outlet and said outlet duct of larger cross section to impart rotation on said runner and said power take-off shaft; and the rotation of said power take-off shaft operating said power generator to generate power.

7. The method according to claim 6, wherein said housing cylindrical chamber has a plurality of said smaller rectangular inlets in laterally spaced relation and a plurality of said larger rectangular outlets in laterally spaced relation formed in said side wall, said inlets and said outlets disposed in horizontally opposed relation, a plurality of said inlet ducts of smaller rectangular cross section each joined in fluid communication with respective ones of said inlets, respectively, and a plurality of said outlet ducts of larger rectangular cross section each joined in fluid communication with a respective one of said outlets, respectively;

said central cylindrical hub is divided into a plurality of laterally spaced central hub portions with a plurality of said circumferentially spaced peripheral blades extending angularly outward from each of said central hub portions, respectively, said plurality of said peripheral blades extending from alternating ones of said central hub portions being offset circumferentially from said plurality of blades extending from laterally adjacent ones of said central hub portions;

said runner and a circumferential segment of said chamber side wall and said laterally spaced central hub portions define laterally spaced isolated arcuate flow passageways of rectangular cross section extending between said inlets and said outlets, respectively; and said step of conducting said incompressible liquid comprises conducting said incompressible liquid through said inlet ducts and inlets to engage said plurality of said circumferentially offset blades disposed in respective ones of said flow passageways and discharging said liquid through respective ones of said outlets and outlet ducts;

said plurality of circumferentially offset blades dividing said laterally spaced flow passageways into unequal volumes such that the volume and head pressure of said incoming liquid is alternately greater and less on laterally adjacent portions of said runner to facilitate rotation of said runner and discharge of said liquid.

8. The method according to claim 6, wherein said housing cylindrical chamber has an upper smaller rectangular inlet and an upper larger rectangular outlet formed in an upper portion of said side wall in horizontally opposed relation, and a lower smaller rectangular inlet and a lower larger rectangular outlet formed in a lower portion of said side wall in horizontally opposed relation;

said upper smaller rectangular inlet disposed above said lower larger rectangular outlet on one side of said housing, and said upper larger rectangular outlet disposed above said lower smaller rectangular inlet on an opposite side of said housing such that fluid is conducted between said upper inlet and upper outlet in a first direction and between said lower inlet and lower outlet in an opposite direction;

an upper inlet duct of smaller rectangular cross section joined in fluid communication with said upper inlet, an upper outlet duct of larger rectangular cross section joined in fluid communication with said upper outlet, a lower inlet duct of smaller rectangular cross section joined in fluid communication with said lower inlet, and a lower outlet duct of larger rectangular cross section joined in fluid communication with said lower outlet;

an upper circumferential segment of said chamber side wall and said runner central hub defining an upper arcuate flow passageway of rectangular cross section extending between said upper inlet and said upper outlet, and a lower circumferential segment of said chamber side wall and said runner central hub defining a lower arcuate flow passageway of rectangular cross section extending between said lower inlet and said lower outlet; and said step of conducting said incompressible liquid comprises simultaneously conducting a first stream of said incompressible liquid in one direction through said upper inlet duct and said upper inlet to engage a plurality of said blades disposed in said upper flow passageway and discharging said first stream of liquid through said upper outlet and said upper outlet duct, and conducting a second stream of said incompressible liquid in an opposed direction through said lower inlet duct and said lower inlet to engage a plurality of said blades disposed in said lower flow passageway and discharging said second stream of liquid through said lower outlet and said lower outlet duct.

9. The method according to claim 8, wherein said housing cylindrical chamber has a plurality of laterally spaced upper smaller rectangular inlets and a plurality of laterally spaced larger rectangular outlets formed in an upper portion of said side wall in horizontally opposed relation, respectively, and a plurality of laterally spaced lower smaller rectangular inlets and a plurality of laterally spaced lower larger rectangular outlets formed in a lower portion of said side wall in horizontally opposed relation, respectively;

said upper smaller rectangular inlets disposed above said lower larger rectangular outlets on one side of said housing, and said upper larger rectangular outlets disposed above said lower smaller rectangular inlets on an opposite side of said housing such that fluid is conducted between said upper inlets and said upper outlets in a first direction and between said lower inlets and said lower outlets in an opposite direction;

a plurality of upper inlet ducts of smaller rectangular cross section each joined in fluid communication with respective ones of said upper inlets, a plurality of upper outlet ducts of larger rectangular cross section each joined in fluid communication with respective ones of said upper outlets, a plurality of lower inlet ducts of smaller rectangular cross section each joined in fluid communication with respective ones of said lower inlets, and a plurality of lower outlet ducts of larger rectangular cross section each joined in fluid communication with respective ones of said lower outlets;

said central cylindrical hub is divided into a plurality of laterally spaced central hub portions with a plurality of said circumferentially spaced peripheral blades extending angularly outward from each of said central hub portions, respectively, said plurality of said peripheral blades extending from alternating ones of said central hub portions being offset circumferentially from said plurality of said peripheral blades extending from laterally adjacent ones of said central hub portions;

said runner and a circumferential upper segment of said chamber side wall and said plurality of laterally spaced central hub portions define a plurality of laterally spaced isolated upper arcuate flow passageways of rectangular cross section extending between said upper inlets and said upper outlets, respectively, and a lower circumferential segment of said chamber side wall and said laterally spaced central hub portions define a plurality of laterally spaced isolated lower arcuate flow passageways of rectangular cross section extending between said lower inlets and said lower outlets, respectively, and;

said step of conducting said incompressible liquid comprises conducting an upper stream of incompressible liquid in one direction through selected ones of said upper inlet ducts and inlets to engage said plurality of said circumferentially offset blades disposed in respective ones of said upper flow passageways and discharging said upper stream of liquid through respective ones of said upper outlets and outlet ducts; and conducting a lower stream of incompressible liquid in an opposed direction through selected ones of said lower inlet ducts and inlets to engage said plurality of said circumferentially offset blades disposed in said lower flow passageways and discharging said liquid through respective ones of said lower outlets and outlet ducts;

said plurality of circumferentially offset blades dividing said laterally spaced upper and lower flow passageways into unequal volumes such that the volume and head pressure of said upper stream and said lower stream of incoming liquid are alternately greater and less on alternate lateral upper and lower portions of said runner to facilitate rotation of said runner and discharge of said liquid streams.

* * * * *